United States Patent [19]

Watanabe

[11] Patent Number: 4,985,194

[45] Date of Patent: Jan. 15, 1991

[54] METHOD OF MAKING A DECORATIVE OBJECT HAVING A NOTCH-CUT BACK SIDE

[75] Inventor: Toshiharu Watanabe, Minokamo, Japan

[73] Assignee: Sakae Riken Kogyo Co., Ltd., Japan

[21] Appl. No.: 174,351

[22] Filed: Mar. 28, 1988

[30] Foreign Application Priority Data

Apr. 3, 1987 [JP] Japan .................... 62-82604

[51] Int. Cl.⁵ .................. B29C 45/14; B29C 45/16; B32B 27/08
[52] U.S. Cl. .................. 264/247; 264/259; 264/339
[58] Field of Search .................. 264/247, 259, 295, 339

[56] References Cited

U.S. PATENT DOCUMENTS

| | | | |
|---|---|---|---|
| 3,654,062 | 4/1972 | Loew | 264/259 X |
| 4,016,235 | 4/1977 | Ferro | 264/259 X |
| 4,307,527 | 12/1981 | Suzuki | 264/259 X |
| 4,537,739 | 8/1985 | Ruhl | 264/247 |
| 4,898,706 | 2/1990 | Yabe et al. | 264/247 X |

FOREIGN PATENT DOCUMENTS

| | | | |
|---|---|---|---|
| 56-118835 | 9/1981 | Japan | 264/259 |
| 61-268420 | 11/1986 | Japan | 264/259 |

Primary Examiner—Jeffery Thurlow
Assistant Examiner—Leo B. Tentoni
Attorney, Agent, or Firm—Larson and Taylor

[57] ABSTRACT

A method of manufacturing a decorative object made of colorless transparent or colored semi-transparent synthetic resin is provided wherein a film, on which letters, patterns or the like are displayed, is bonded to a notch-cut back side of the object. The steps of the method include setting the film onto a notch-cut and engraved surface of a die half, closing the die half with another die half, and injecting the transparent or semi-transparent synthetic resin into the closed die halves to mold the decorative object and to closely bond the film to the notch-cut surface of the decorative object thus molded.

4 Claims, 3 Drawing Sheets

METHOD OF MAKING A DECORATIVE OBJECT HAVING A NOTCH-CUT BACK SIDE

BACKGROUND OF THE INVENTION

The design of automobiles or motorcars has tended to follow aerodynamics these days and decorative members and plates (or ornaments, emblems and the like) for decorating the appearance of the automobiles have been requested to be more and more flush accordingly.

The rear panel garnish, for example, can be cited as a decorative member (or plate) attached to the automobiles, but in the case of those rear panel garnishes whose back sides are continuously notch-cut, it is difficult to closely bond letters, patterns or the like to the notch-cut back sides of the rear panel garnishes so as to display the letters, patterns or the like through the garnishes. No satisfactory rear panel garnish has been made yet according to the conventional method.

SUMMARY OF THE INVENTION

The present invention relates to an improved decorative member (or plate) attached to the automobiles, motorcycles and the like. The present invention also relates to a method of manufacturing the decorative member (or plate).

A colorless or colored light-passing decorative plate made of transparent or semitransparent synthetic resin is characterized in that a film on which letters, patterns or the like are displayed is closely bonded to the notch-cut back side of the decorative plate. A method of manufacturing this decorative plate comprises setting a film, on which letters, patterns or the like are displayed, onto the notch-cut surface of a die half, closing die halves toward each other and injecting transparent or semitransparent synthetic resin into the die to cause the film to follow the notch-cut surface of the die half and be combined with a decorative plate to be molded. The decorative plate having a notch-cut back side is thus molded.

An object of the present invention is to provide a highly-designed decorative plate whose front side is flush but whose back side is notch-cut and capable of meeting the aim of aerodynamics and creating three dimensional letters, patterns or the like when viewed by the eyes of human being.

Another object of the present invention is to provide a method of efficiently manufacturing the highly-designed decorative plate having a flush front side but a notch-cut back side and capable of meeting the aim of aerodynamics and creating three-dimensional letters, patterns or the like when viewed by the eyes of human being.

These and other objects of the present invention can be achieved by a light-passing decorative matter having a notch-cut back side and by a method of manufacturing the same, and this decorative matter and its manufacturing method will be described in detail with reference to the accompanying drawings.

It should be understood that any changes which can be made without departing from the scope of the present invention are included in claims appended hereto.

BRIEF DESCRIPTION OF THE DRAWINGS

FIG. 1b shows the decorative plate attached to the rear of the automobile shown in FIG. 1a.

DETAILED DESCRIPTION OF THE PREFERRED EMBODIMENTS

Figure 1A:
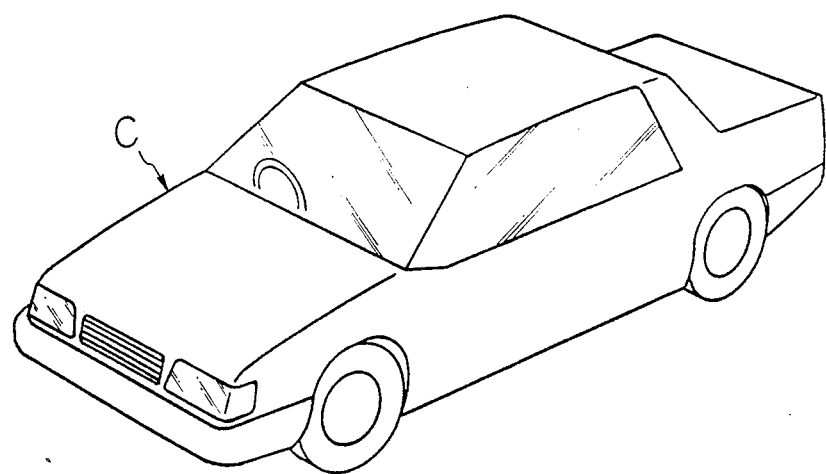
FIG. 1a shows the appearance of an automobile to which a decorative plate of the present invention is attached.
Figure 1B:
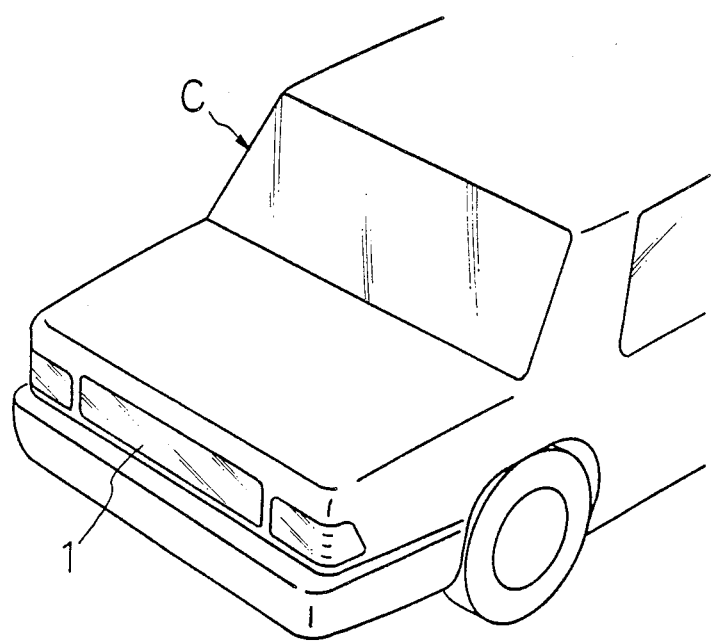
Figure 1C:
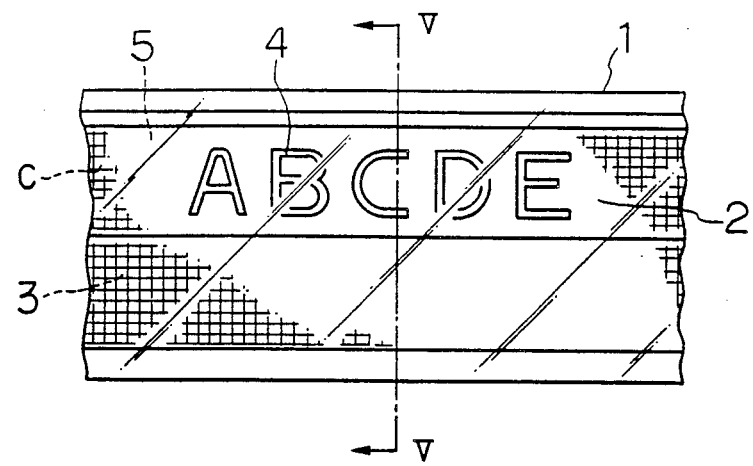
FIG. 1c shows a part of the decorative plate.

FIG. 1a shows the appearance of an automobile (C), FIG. 1b shows a decorative plate (1) of the present invention attached to the rear of the automobile (C) as the rear panel garnish, and FIG. 1c shows the detail of the decorative plate (1).

FIG. 1c shows the decorative plate (1) (or rear panel garnish in this case) made of colorless transparent or colored semitransparent synthetic resin (such as acrylic resin and polycarbonate resin) according to the present invention, and the decorative plate (1) has a flush front side (2) but a notch-cut (or fish-eye cut) back side (3). The shape or form of this cut may be freely selected.

Closely bonded to the cut surface (c) of the back side (3) is a film (5) made of polycarbonate resin and on which letters, patterns (4) or the like are displayed by thermal transfer, silk printing, sputtering, vacuum deposition, hot stamping or the like.

When the decorative plate (1) is thus made, letters, patterns (4) or the like can be seen through the cut surface (c) thereof as if they were three-dimensional letters, patterns or the like.

A method of manufacturing the decorative plate (1) will be described below.

Figure 2:
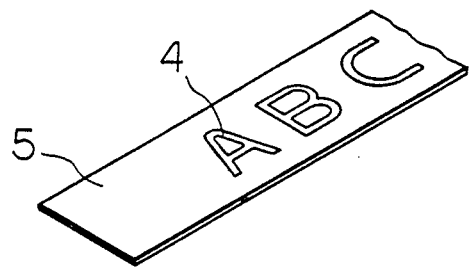
FIG. 2 shows a part of a film.

As shown in FIG. 2, the film (5) made of polycarbonate resin is prepared and letters, patterns (4) or the like are applied to the front or back side of the film (5) according to any of the above-mentioned manners.

Figure 3:
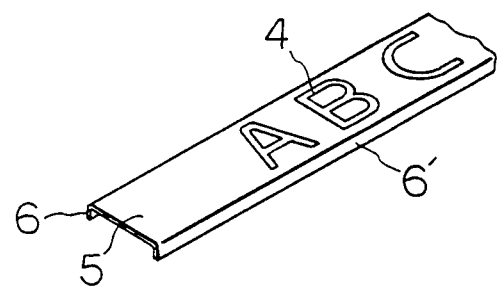
FIG. 3 shows the film bent along its rims.

The film (5) is then bent to form bent rims (6) and (6'), as shown in FIG. 3, and this is intended to fit the film (5) in a molding die which will be described later.

Figure 4:
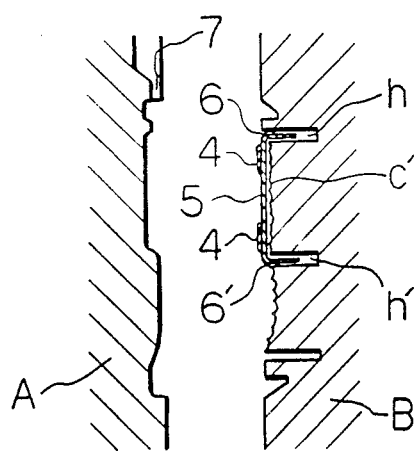
FIG. 4 is a sectional view showing the film set in a die.

FIG. 4 shows the molding die comprising a fixed half (A) and a movable half (B), which are separated from each other in FIG. 4. The film (5) is set onto the movable half (B) in such a way that its bent rims (6) and (6') are fitted into molding grooves (h) and (h') on the movable half (B). That surface (c') of the movable half (B) with which the film (5) is to be contacted is engraved, corresponding to the cut surface (c) of the decorative plate (1). The film (5) shown in FIG. 4 is floated a little from the engraved surface (c') of the movable half (B). Numeral (7) represents a nozzle through which the synthetic resin is injected.

The fixed and movable halves (A) and (B) are combined with each other and the injection molding is carried out through the nozzle (7).

Figure 5:
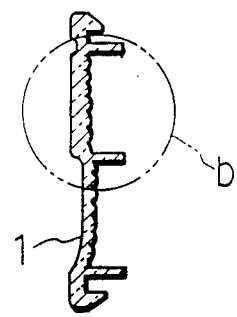
FIG. 5 is a sectional view taken along a line V—V in FIG. 1c.

Finally, the movable half (B) is separated from the fixed half (A) and the decorative plate (1) shown in FIG. 5 (or shown by the sectional view taken along the line V—V in FIG. 1c) is picked up.

Figure 6:
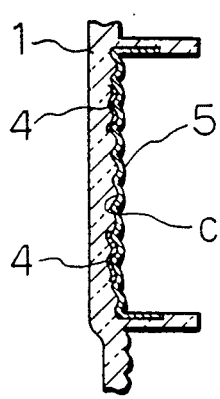
FIG. 6 is an enlarged view showing a part of the decorative plate shown in FIG. 5.

FIG. 6 is an enlarged view showing the decorative plate (1) enclosed by a two-dot and dash loop line (b) in FIG. 5 and the film (5) is closely bonded to the cut surface of the decorative plate (1).

The film (5) is made of polycarbonate resin, as described above, because this resin is durable to heat. The film (5) was made 0.1-1.2 mm thick.

Polycarbonate resin is durable to heat, as described above, and even when other resin injected at the time of molding the decorative plate (1) is high in temperature, therefore, the form of the film (5) can be held stable.

There is fear that the film (5) is deformed by the injection pressure caused at the time of injection mold and that air created at the time of injection mold is confined between the film (5) and the decorative plate (1) molded to impair the appearance of the film. Therefore, the film (5) has such a stiffness, thickness and quality of material as to eliminate the fear.

When a layer of such an adhesive that enables the film (5) to closely adhere to acrylic resin was applied to the film (5), the adhering strength of the film (5) could be enhanced to about 6 kg/cm at the peeling tests.

Figure 7:
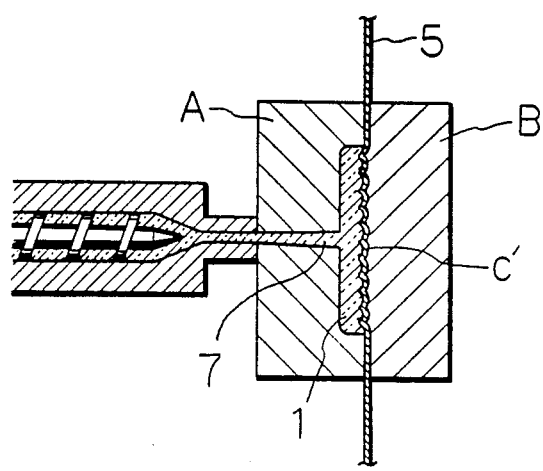
FIG. 7 is a vertically-sectioned view showing another example of the decorative plate molded in a die.

The injection molding may be carried out with the film (5) extended outside the molding die and sandwiched between the fixed and movable die halves (A) and (B), as shown in FIG. 7.

The decorative plate according to the present invention is transparent or semitransparent, having a notch-cut back side, to which the film on which letters, patterns or the like are displayed is closely bonded. When these letters, patterns or the like are viewed particularly at night, therefore, they appear three-dimensionally in the dark because light is diffusedly reflected while passing through the decorative plate. The decorative plate can be thus made with a higher quality of design, a higher efficiency and a lower cost.

What is claimed is:

1. A method of manufacturing a light-passing decorative object provided with a notch-cut back side and made of colorless transparent non-polycarbonate synthetic resin comprising setting a discrete film of a thickness from about 0.1 to 1.2 mm, which is fabricated of a polycarbonate resin and is more heat durable than said synthetic resin and on which predetermined patterns are displayed, onto a notch-cut and engraved surface of one die half of a die, closing said one die half with another die half, and injecting the transparent synthetic resin into the die to mold a said decorative object having a notch-cut surface and to closely bond the film to the notch-cut surface of the decorative object so molded, said discrete film being bent to form at least one rim and the at least one bent rim of said film being inserted into a groove in the inner surface of said one die half.

2. A method according to claim 1 wherein said patterns comprise letters.

3. A method of manufacturing a light-passing decorative object provided with a notch-cut back side and made of colored semi-transparent non-polycarbonate synthetic resin comprising setting a discrete film of a thickness from about 01 to 1.2 mm, which is fabricated of polycarbonate and is more heat durable than said synthetic resin and on which predetermined patterns are displayed, onto a notch-cut and engraved surface of one die half of a die, closing said one die half with another die half, and injecting the semi-transparent synthetic resin into the die to mold a said decorative object having a notch-cut surface and to closely bond the film to the notch-cut surface of the decorative object so molded, said discrete film being bent to form at least one bent rim and said bent rim of the film being fitted into a groove in the inner surface of said one die half.

4. A method according to claim 3 wherein said patterns comprise letters.

* * * * *